Sept. 26, 1967

D. L. FAYRAM 3,344,427

RADAR SYSTEM WITH BUILT-IN TEST CAPACITY

Filed Dec. 29, 1965

INVENTOR.
David L. Fayram

BY
Albert F. Duke

ATTORNEY

United States Patent Office 3,344,427
Patented Sept. 26, 1967

3,344,427
RADAR SYSTEM WITH BUILT-IN
TEST CAPACITY
David L. Fayram, Greendale, Wis., assignor to General Motors Corporation, Detroit, Mich., a corporation of Delaware
Filed Dec. 29, 1965, Ser. No. 517,308
7 Claims. (Cl. 343—17.7)

ABSTRACT OF THE DISCLOSURE

This invention relates to a radar provided with a control switch adapted to selectively connect adjustable time delay circuitry in series with the radar transmitting circuit to delay transmission of the R.F. signal to a passive target and consequently reception of an echo signal thus simulating lengthening and foreshortening of the target to thereby check the computational accuracy of the radar with changes in target range.

---

This invention relates to radar systems and to a method of testing the computational accuracy thereof, and more particularly to a radar system having a built-in test capacity permitting alignment thereof in conjunction with a natural or man-made target.

Conventionally, a radar system timing is generated from a pulse source which feeds synchronizing trigger pulses to a computer and display indicators and also triggers the radar modulator which in turn fires the magnetron in the transmitter. The computer operates on the time interval between a synchronizing trigger pulse and the echo received from the target to compute range which is fed to the indicators to provide a visual display of target range.

Presently, radar system alignment is accomplished with an external test generator which is separate from the radar and performs the function of simulating a target at a given range by transmitting pulses to the radar which are delayed in time by a given amount from the pulses transmitted by the radar. By comparing the range fed to the test set with the indicated range, the radar may be calibrated. This alignment procedure is lengthy and requires extensive ground equipment which cannot be used during adverse weather conditions. Moreover, externally generated test signals cannot be made to duplicate the conditions of an actual target thus introducing system errors.

In accordance with the present invention, a radar system is provided which includes a built-in test capacity that permits alignment or check out of the system by transmittal to and reception from a natural or man-made target. In order to exercise the system and determine the radar's accuracy with changes in distance, delay means are provided to delay triggering of the radar modulator thus delaying transmission to the target and consequently reception of the echo from the target. By calibrating the delay means and adding a known fixed delay period, the target distance can be artificially increased. Moreover, the target distance as computed may be artificially foreshortened by providing a delay which when added to the delay representing the actual range of the target is greater than one radar computational period since the computer operation is based on the echo received after a synchronizing pulse regardless of where the echo pulse occurs in the synchronizing pulse train.

Figure 1:
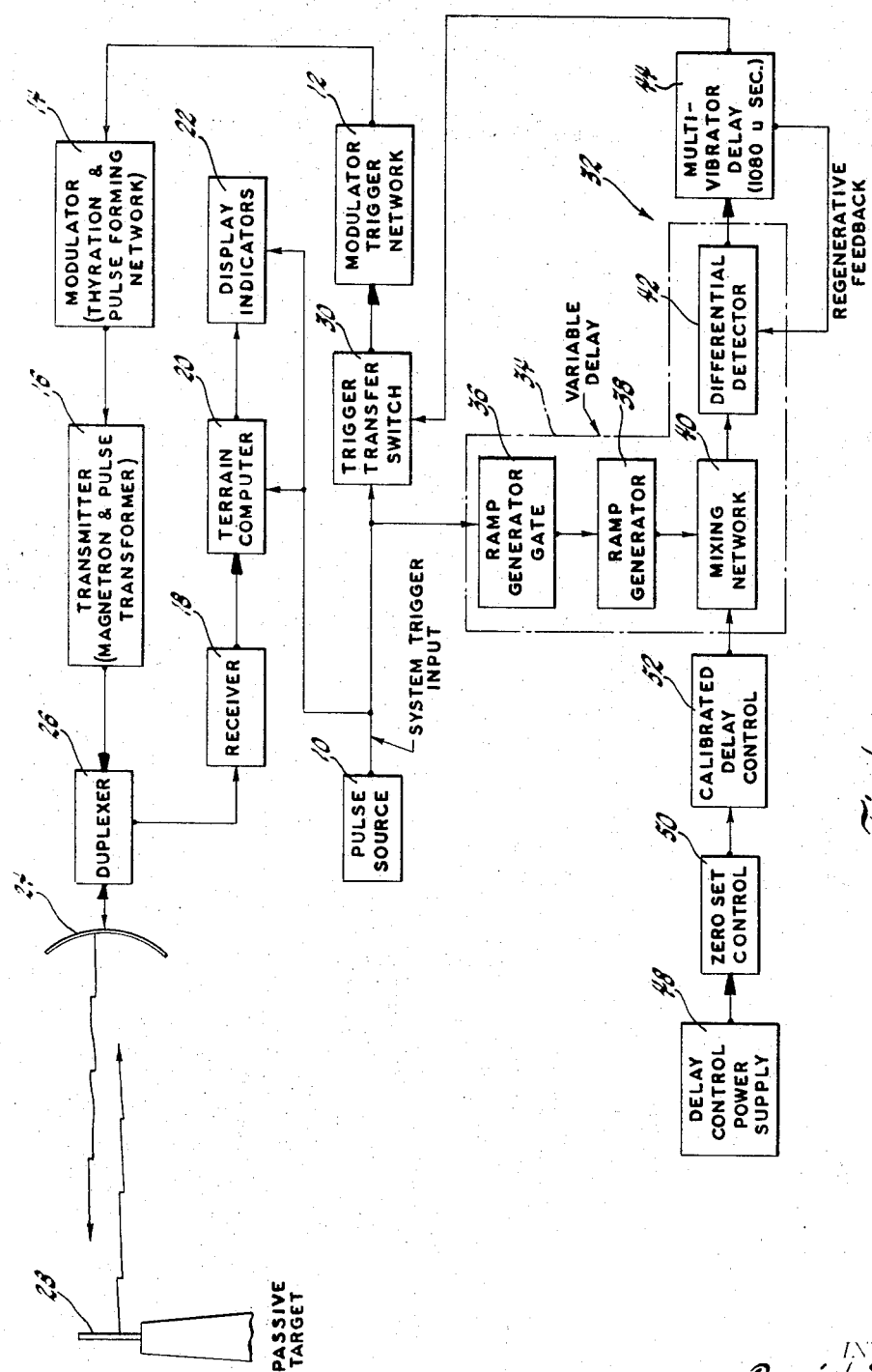
Figure 2:
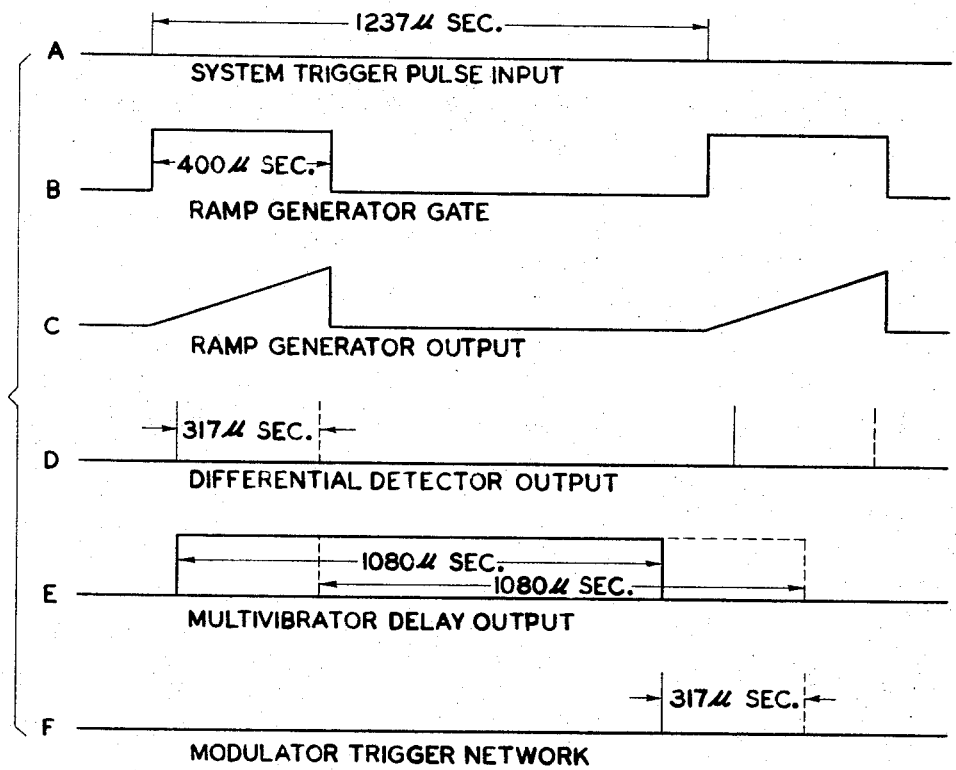
Figure 3:
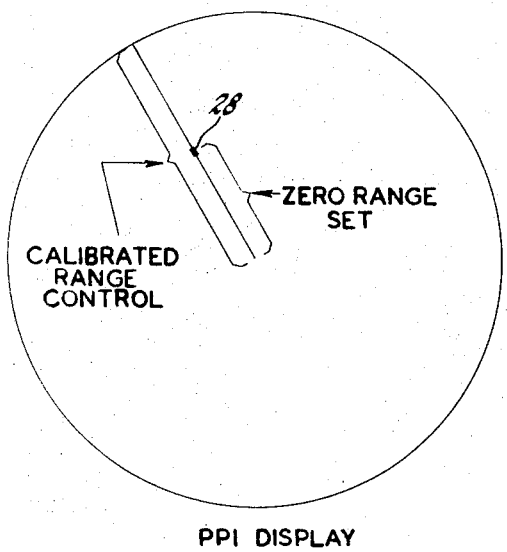

A more complete understanding of the present invention may be had from the following detailed description which should be read in conjunction with the drawings in which:

FIGURE 1 is a block diagram of the system;
FIGURE 2 shows waveforms at various points in the delay circuitry;
FIGURE 3 is a plan position indicator display.

Referring now to the drawings and initially to FIGURE 1, there is shown a block diagram of a radar system which includes a built-in test capability in accordance with the present invention. The radar includes a pulse source 10, a modulator trigger network 12, a modulator 14, a transmitter 16, a receiver 18, a terrain computer 20, and display indicators 22. An antenna 24 is connected through a duplexer 26 to the transmitter 16 and receiver 18 for transmitting to and receiving from a passive target 28. In addition to providing system trigger, the pulse source 10 provides a synchronizing trigger to the computer 20 and indicators 22.

A trigger transfer switch 30 has a normal position in which the output of the pulse source 10 is fed directly to the modulator trigger network 12 and a test position wherein the output of the pulse source 10 is fed through the delay circuitry generally designated 32 and then to the modulator trigger network 12. The delay circuitry 32 includes variable delay circuitry 34 which comprises a ramp generator gate 36, a ramp generator 38, a mixing network 40, and a differential detector 42. The delay circuitry 32 further includes a monostable multivibrator 44 which provides a fixed delay. The output of the multivibrator 44 is connected to the modulator trigger network 12 through the trigger transfer switch 30 and is also regeneratively fed back to the differential detector 42. Alternatively a level sensing monostable multivibrator such as disclosed in copending application Ser. No. 517,276, filed Dec. 29, 1965 and assigned to the assignee of the present invention may be used in place of the detector 42 and multivibrator 44. The mixing network 40 also receives a DC analog voltage input provided by a power supply 48, a zero set control potentiometer 50, and a calibrated delay control potentiometer 52.

The output waveforms at different locations in the delay circuitry 32 are shown in FIGURE 2. In the following discussion the radar computational period is assumed to be 1237 microseconds with a variable delay of up to 317 microseconds and a fixed delay of 1080 microseconds. It will be understood that these specific values have been chosen merely to facilitate a clear understanding of the operation of the delay circuitry 32. Waveform A represents the pulse train from the source 10 wherein the pulses are separated by 1237 microseconds. The output from the ramp generator gate 36 is shown at B and is a square wave of 400 microseconds duration which gates the ramp generator 38, the waveform of which is shown at C. The precision variable delay from the delay circuitry 32 is accomplished by mixing the delay analog DC from the controls 50 and 52 and the precision ramp voltage from the ramp generator 38 in the mixing network 40 with detection of the mixed output at a fixed voltage level in the differential detector 42, the output of which is shown at waveform D. The output of the differential detector 42 triggers the multivibrator 44 providing the 1080 microsecond delay as shown at E. The delay trigger of the multivibrator 44 is fed through the switch 30 to the modulator trigger network 12, the output of which is shown at F.

The two delay control potentiometers 50 and 52 are adjustable independently. The delay control 52 is precisely calibrated over a range of 0 to 10 nautical miles in increments of one nautical mile and will introduce a delay of from 0 to 123.7 microseconds into the variable delay circuitry 32 independently of the position of the zero set control potentiometer 50. Likewise, the zero set control potentiometer 50 will provide an uncalibrated delay of from 0 to 194 microseconds independently of the position of the calibrated delay control 52. Accordingly, the variable delay circuitry 32 is capable of delaying the pulses from the source 10 over a range of from 0 to approximately 317 microseconds. It will be noted that the total time delay provided by the 1080 microseconds fixed delay and the 317 microseconds variable delay is sufficient to delay triggering of the modulator 14 and consequently transmittal and reception of the radar signal at the antenna 24 to greater than the 1237 microseconds radar computational period.

The following will illustrate how an actual target located within a 10 nautical mile range may be artificially "moved" to a distance from 0 to 10 nautical miles. By adding a 280.7 microseconds delay from the variable delay circuitry 34 to the fixed 1080 microseconds delay, a target at 0 range may be artificially moved to a range of 10 nautical miles (123.7 microseconds) since the total delay of 1360.7 microseconds would cause the echo pulse to be received 123.7 microseconds after a synchronizing trigger which occurs every 1237 microseconds. Likewise, by adding a 33.3 microseconds delay from the variable delay circuitry 34 to the 1080 delay, a target at 10 nautical miles (123.7 microseconds) may be artificially moved to 0 range since the total delay will be 123.7+33.3+1080 or 1237 microseconds and occurs simultaneously with a synchronizing pulse from the source 10.

The operation of the system may be summarized as follows: With the trigger transfer switch 30 in the normal position, the operator can observe the target 28 on a PPI display such as shown in FIGURE 3. By setting the calibrated delay control 52 to 0 range and switching the trigger transfer switch 30 to the test position, the operator can "move" the test target 28 to 0 range by manipulating the zero set control 50. The delay circuitry 32 is now range calibrated with respect to the particular target 28 and system alignment can be accomplished by varying the calibrated delay control over the 0–10 nautical mile range and observing actual radar returns.

While the invention has been described with regards to a preferred embodiment thereof, modifications and variations will now occur to those skilled in the art. For a definition of the invention, reference is made to the appended claims.

I claim:

1. A radar system comprising a source of reference pulses,
    transmitter means responsive to said reference pulses for transmitting high energy pulses to a target,
    receiver means for receiving echo pulses from said target,
    computer means responsive to said reference pulses and said echo pulses for computing the distance of said target,
    adjustable time delay means,
    switching means having a first position connecting said source to said transmitter means and a second position connecting said time delay means between said source and said transmitting means.

2. The system defined in claim 1 wherein said time delay means includes variable and fixed time delay means.

3. The system defined in claim 2 further including control means for developing a DC analog voltage for controlling the delay in said variable time delay means.

4. The system defined in claim 3 wherein said variable time delay means includes ramp generator means,
    gating means for enabling said ramp generator means in synchronism with said reference pulses,
    mixing means responsive to the output of said ramp generator means and said DC analog voltage,
    differential detector means for developing a trigger pulse in response to the output of said mixing means,
    said fixed time delay means comprising a multivibrator responsive to the output pulse from said differential detector means.

5. The system defined in claim 4 wherein the time delay introduced by said multivibrator is less than one radar computational period and wherein said variable time delay means is variable over a range sufficient to extend the total time delay of said time delay means to greater than one radar computational period.

6. A method of simulating changes in the range of a fixed target to test the computational accuracy of a radar having transmitting means for transmitting RF pulses to said target,
    receiving means for receiving echo pulses from said target,
    computing means for computing the apparent range of said target as a function of the delay between echo pulses and reference pulses comprising the steps of
    delaying the transmission of said RF pulses for a time interval such that the echo pulses are received in synchronism with reference pulses to simulate zero target range and further delaying the transmission of said RF pulses in predetermined calibrated increments to simulate both lengthening and foreshortening of the actual range of the target.

7. A method of simulating changes in the range of a fixed target to test the computational accuracy of a radar having transmitting means, receiving means, computer means and pulse generating means comprising the steps of generating pulses from said pulse generating means,
    feeding said pulses to said computer means,
    delaying said pulses and feeding said delayed pulses to said transmitting means,
    transmitting RF pulses to a target in synchronism with said delayed pulses,
    receiving echo pulses from said target,
    computing the range of said target as a function of the time interval between an undelayed pulse and an echo pulse,
    simulating foreshortening and lengthening of the range of said target by adjusting the time delay of said pulses to a value which when added to the inherent delay representing the actual range of said target causes the undelayed pulses and said echo pulses to occur simultaneously at said computer means and thereafter increasing the delay of said delayed pulses over a predetermined range.

References Cited

UNITED STATES PATENTS

| | | | |
|---|---|---|---|
| 2,478,208 | 8/1949 | Rothman et al. | 343—17.7 X |
| 2,942,256 | 6/1960 | Strickland | 343—17.7 |

RODNEY D. BENNETT, *Primary Examiner.*

T. H. TUBBESING, *Assistant Examiner.*